United States Patent
Liu et al.

(10) Patent No.: US 10,516,615 B2
(45) Date of Patent: Dec. 24, 2019

(54) NETWORK TRAFFIC CONGESTION CONTROL

(71) Applicant: FUJITSU LIMITED, Kawasaki-shi, Kanagawa (JP)

(72) Inventors: Lei Liu, San Jose (CA); Akira Ito, Sun Jose (CA); Wei-Peng Chen, Fremont (CA)

(73) Assignee: FUJITSU LIMITED, Kawasaki (JP)

( * ) Notice: Subject to any disclaimer, the term of this patent is extended or adjusted under 35 U.S.C. 154(b) by 138 days.

(21) Appl. No.: 15/583,987

(22) Filed: May 1, 2017

(65) Prior Publication Data
US 2018/0316614 A1 Nov. 1, 2018

(51) Int. Cl.
*H04L 12/801* (2013.01)
*H04L 12/26* (2006.01)
*H04L 12/741* (2013.01)
*H04L 12/823* (2013.01)

(52) U.S. Cl.
CPC .......... *H04L 47/12* (2013.01); *H04L 43/0864* (2013.01); *H04L 43/0894* (2013.01); *H04L 43/16* (2013.01); *H04L 45/745* (2013.01); *H04L 47/32* (2013.01)

(58) Field of Classification Search
CPC ... H04L 43/0864; H04L 43/16; H04L 45/745; H04L 47/12; H04L 47/32; H04L 43/0894; H04W 28/14
See application file for complete search history.

(56) References Cited

U.S. PATENT DOCUMENTS

| | | | |
|---|---|---|---|
| 2003/0012217 A1* | 1/2003 | Andersson | H04W 36/06 370/437 |
| 2004/0001461 A1* | 1/2004 | Lohtia | H04W 36/26 370/331 |
| 2014/0129736 A1* | 5/2014 | Yu | H04L 45/08 709/242 |
| 2014/0280823 A1* | 9/2014 | Varvello | H04L 67/327 709/223 |
| 2015/0281083 A1* | 10/2015 | Kim | H04L 45/7457 370/235 |

(Continued)

OTHER PUBLICATIONS

"OpenFlow Switch Specification", Open Networking Foundation (ONF), version 1.3.2, Apr. 25, 2013, pp. 1-131.

(Continued)

*Primary Examiner* — Ricardo H Castaneyra
(74) *Attorney, Agent, or Firm* — Maschoff Brennan

(57) ABSTRACT

Technologies are described to control network congestion in packet-based networks. In some examples, a method may include receiving an Interest packet requesting content, and returning the content from a local data store if the content is in the local data store. The method may also include determining whether a previous request has been made for the requested content if the content is not in the local data store, and creating a record of the Interest packet and discarding the Interest packet if a previous request has been made. The method may further include determining whether a local IP routing table includes an entry that matches a destination IP address specified by the Interest packet if a previous request has not been made, and forwarding the Interest packet if the destination IP address is in the local IP routing table.

18 Claims, 5 Drawing Sheets

(56) References Cited

U.S. PATENT DOCUMENTS

2016/0019110 A1\* 1/2016 Mosko ................ G06F 11/0784
 714/57
2018/0103128 A1\* 4/2018 Muscariello .......... H04L 45/745

OTHER PUBLICATIONS

Allman et al., "TCP Congestion Control", IETF RFC 2581, Apr. 1999, pp. 1-14.
Cheriton, "Sirpent: A High-Performance Internetworking Approach", ACM SIGCOMM Computer Communication, vol. 19, Issue 4, Aug. 1989, pp. 158-169.
Evans and Filsfils, "Deploying IP and MPLS QoS for Multiservice Networks: Theory & Practice", Morgan Kaufmann Publishers Inc., 2007, pp. 1-456.
Ghosh and Varghese, "Symmetrical Routes and Reverse Path Congestion Control", Washington University Open Scholarship, Jan. 1, 1997, pp. 1-17.
Kung and Chapman, "The FCVC (flow-controlled virtual channels) proposal for ATM networks: a summary", International Conference on Network Protocols (ICNP), 1993, pp. 116-127.
Kung et al., "Credit-Based Flow Control for ATM Networks: Credit Update Protocol, Adaptive Credit Allocation, and Statistical Multiplexing", ACM SIGCOMM Computer Communication, vol. 24, Issue 4, Oct. 1994, pp. 101-114.
Ren et al., "Congestion control in named data networking—A survey", Computer Communications, vol. 86, Apr. 2016, pp. 1-11.
Schroeder et al., "Autonet: a High-speed, Self-Configuring Local Area Network Using Point-to-Point Links", IEEE Journal on Selected Areas in Communications, vol. 9, Issue 8, Oct. 1991, pp. 1318-1335.
Zhang et al., "Named Data Networking", ACM SIGCOMM Computer Communication Review, vol. 44, Issue 3, Jul. 2014, pp. 66-73.
Amin et al. "Leveraging ICN for Secure Content Distribution in IP Networks" Proceedings of the 24th ACM international conference on Multimedia, pp. 765-767; Oct. 2016.
Mishra and Kanakia, "A hop by hop rate-based congestion control scheme", ACM SIGCOMM Computer Communication, vol. 22, Issue 4, Aug. 1992, pp. 112-123.

\* cited by examiner

NETWORK TRAFFIC CONGESTION CONTROL

FIELD

The described technology relates generally to managing congestion in data communication networks.

BACKGROUND

Data communication networks are widely used to transport data from one device to another device. The most prevalent is the Internet, which is a global system of interconnected computer networks that use the Transmission Control Protocol (TCP) and the Internet Protocol (IP) protocol suite. As more and more data are being transported across the Internet, network traffic congestion is becoming an increasing concern. Typical effects of network congestion include transmission delay, packet (data) loss, and the blocking of new connections.

TCP congestion control is the primary mechanism for controlling congestion on the Internet. A congestion window, which indicates the maximum number of packets that can be sent out on a connection without being acknowledged, is maintained by the sender to do congestion avoidance. Congestion is detected when an acknowledgement for a packet is not received within a round-trip delay estimate (the estimated timeout).

Other congestion control mechanisms such as traffic engineering, network engineering, and network planning have been used by network carriers and operators to address the problems associated with network congestion.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to some examples, methods to control network congestion in packet-based networks are described. An example method may include receiving an Interest packet requesting content, and returning the content from a local data store if the content is in the local data store. The method may also include determining whether a previous request has been made for the requested content if the content is not in the local data store, and creating a record of the Interest packet and discarding the Interest packet if a previous request has been made for the requested content. The method may further include determining whether a local IP routing table includes an entry that matches a destination IP address specified by the Interest packet if a previous request has not been made, and forwarding the Interest packet if the destination IP address is in the local IP routing table. The method may also include discarding the Interest packet if the destination IP address is not in the local IP routing table.

The objects and advantages of the embodiments will be realized and achieved at least by the elements, features, and combinations particularly pointed out in the claims. Both the foregoing general description and the following detailed description are given as examples, are explanatory and are not restrictive of the invention, as claimed.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DESCRIPTION OF EMBODIMENTS

Figure 1:
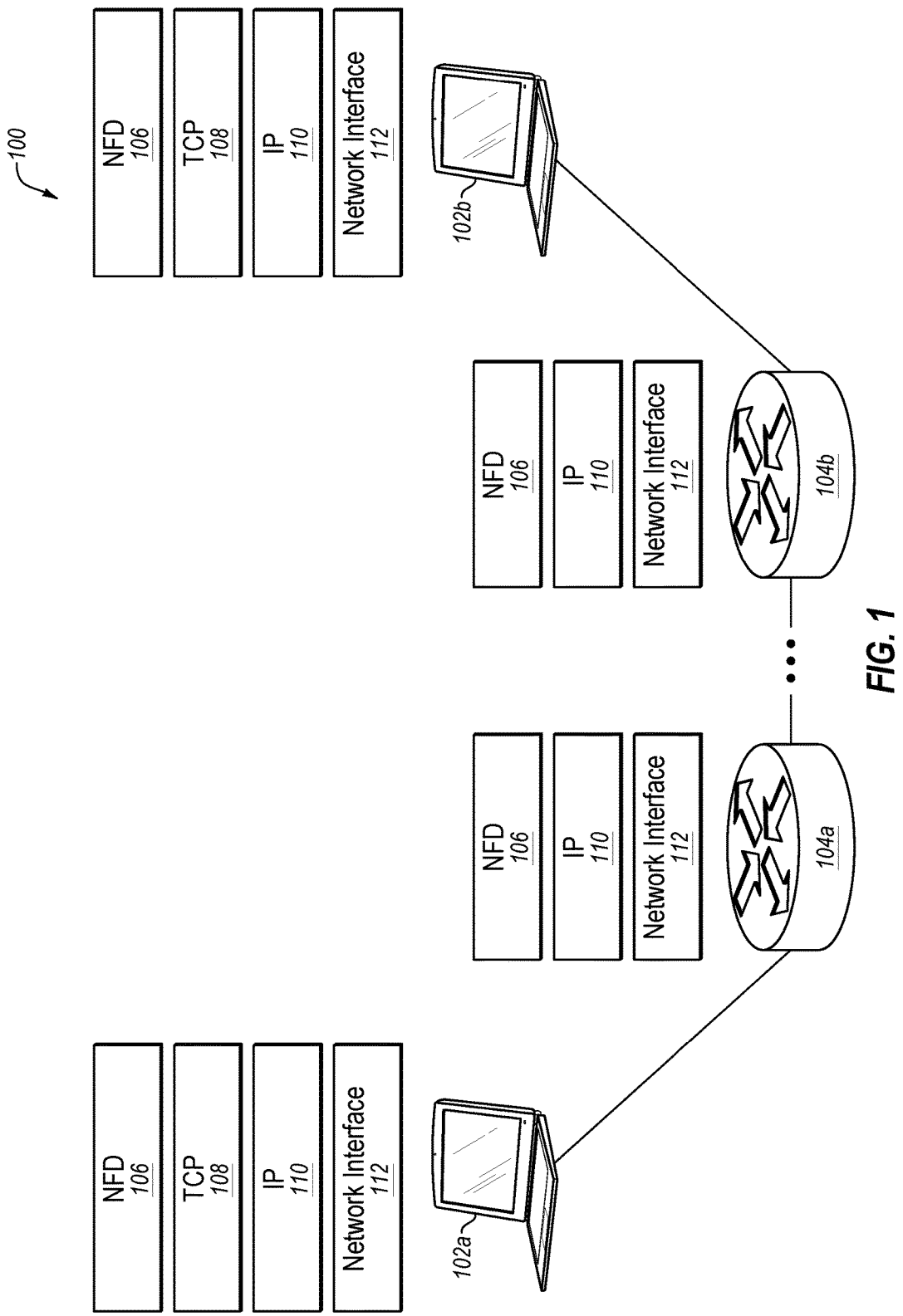
FIG. 1 illustrates an overview of an environment and devices on which some embodiments of the technology may operate.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

The aforementioned network control mechanisms have been rendered somewhat ineffective due to the dynamic nature of the Internet traffic.

This disclosure is generally drawn, inter alia, to methods, apparatus, systems, devices, and/or computer program products related to packet-based network traffic congestion control.

Technology is described for network architectures for controlling network congestion in packet-based switching networks. The technology incorporates aspects of Named Data Networking (NDN) into existing network architectures to provide control of network congestion.

In some embodiments, the technology incorporates an NDN Forwarding Daemon (NFD) into existing Transmission Control Protocol/Internet Protocol (TCP/IP) infrastructures to provide management and/or control of network congestion in TCP/IP networks. The technology may integrate the NFD on top of the existing TCP/IP protocol stack. As part of the integration, the technology may disable the TCP congestion control mechanism, for example, the additive increase/multicative decrease (AIMD) functionality of the TCP. Incorporating the NFD on top of the TCP allows for the sending and receiving of Interest packets and Data packets, which are two types of packets in NDN, over the TCP/IP network. An Interest packet includes two names, Name1 and Name2. Name1 is the destination IP address, and is used for forwarding purposes. Inclusion of the destination IP address in the Interest packet allows for the use of the IP routing table in forwarding the Interest packet. As a result, no changes are needed to the IP. Name2 is the content name, and is used for content caching and fetching.

In some embodiments, the technology may integrate an NFD in each IP router in the TCP/IP network architecture. As the NFD is integrated into each IP router, both the NFD layer and the IP layer have the same topology. That is, the NFD layer has the same network topology as the IP layer.

When an Interest packet arrives (e.g., an application requests transmission of an Interest packet via an incoming interface to the NFD or an Interest packet arrives at an IP router for forwarding), the NFD may check a local data store to determine whether the requested content (i.e., the content specified by Name2 in the Interest packet) is in the local data store. If the requested content is in the local data store, the NFD returns (provides) the requested content from the local data store, and discards the Interest packet (i.e., does not need to forward the Interest packet for further processing). Otherwise, if the requested content is not in the local data store, the NFD may determine whether it has made a previous request for the requested content (i.e., whether the NFD has previously forwarded an Interest packet that requested the same content). If the NFD has made a previous request for the requested content, the NFD creates a record of the request for the content by the Interest packet, and discards the Interest packet. For example, the NFD may check a local pending interest table (PIT) to determine whether the NFD has previously forwarded an Interest packet that requested the same content (i.e., whether there is a pending Interest packet that requested the same content). The local PIT may identify the Interests (Interest packets) that the NFD has forwarded downstream but has not yet satisfied. If there is a matching entry for the Interest packet in the local PIT that is still within the round trip time (RTT) (i.e., the received Interest packet arrived within the round trip delay time of the matching entry), the NFD records the incoming interface of the Interest packet in the matching PIT entry, and discards the Interest packet. Recording the incoming interface in the matching PIT entry is an indication that the recorded interface (i.e., this Interest packet) also requested the content. Accordingly, subsequent Interest packets for the same content that are received within one RTT of a previously received Interest packet for the same content are aggregated and not forwarded. Otherwise, if the NFD has not made a previous request for the requested content (e.g., there is no matching entry in the local PIT), the NFD may check the IP routing table to determine whether there is an entry for the IP address (i.e., the IP address specified by Name1 in the Interest packet). If there is a matching entry in the IP routing table, then the NFD creates a record of the request for content by the Interest packet (e.g., the NFD makes an entry for this Interest packet in the local PIT), and forwards the Interest packet downstream for further processing. A matching entry in the IP routing table is an indication that the IP knows how to forward the Interest packet downstream, i.e., to the next hop. Otherwise, if there is no matching entry in the IP routing table, then the NFD discards the Interest packet. In this instance, the NFD may send an error message to the incoming interface, for example, that the Interest packet could not be forwarded.

In some embodiments, the NFD may apply a forwarding strategy to determine whether an Interest packet should be forwarded for further processing. The forwarding strategy may specify policies and/or rules regarding the forwarding of Interest packets. For example, the NFD may check to determine whether forwarding an Interest packet over an outgoing link will cause the outgoing link to exceed its sending rate. If the NFD determines that the sending rate for the outgoing link will be exceeded, the NFD may buffer the Interest packet, for example, to be forwarded at a subsequent time. Additionally or alternatively, the NFD may attempt to forward the Interest packet over a different link. In another example, the NFD may check to determine whether the outgoing link is fully occupied. If the NFD determines that the outgoing link is fully occupied, the NFD may buffer the Interest packet. Additionally or alternatively, the NFD may attempt to forward the Interest packet over a different link.

When a Data packet arrives at an NFD, the NFD may identify all requestors that requested the Data packet, for example, according to the PIT (i.e., identify all pending requests for the content included in the Data packet), and forward the Data packet to all the requestors. The NFD may then remove any record of the pending requests (e.g., remove the records in the PIT), and locally store the content (e.g., cache the content). For example, the NFD may identify the matching PIT entry in the local PIT, and forward the Data packet to all downstream interfaces listed for that PIT entry. The NFD may then remove the PIT entry from the local PIT, and store the content in a local data store.

Integrating the NFD into each IP router allows for hop-by-hop traffic control in that any reduction in traffic rate occurs only on the congested link. Integration of the NFD in each IP router also allows for stateful (i.e., state aware) forwarding in that the router has knowledge of what Interest packets are pending for data. That is, each router has knowledge regarding the number of Data packets that will be received by the router.

In some embodiments, the NFD may control the Data packet traffic rate (i.e., Data packet sending rate/number) by controlling the Interest packet sending rate (i.e., Interest packet sending rate/number). Data packets take the reverse path of their respective Interest packets, and, in the absence of packet loss, one Interest packet results in one Data packet on each link, resulting in flow balance. Suppose a constant ratio r of data size/interest size, and c of a specific link rate (link capacity). An ingress Interest packet rate of c/r causes an egress Data packet rate of c. Controlling or maintaining the ingress Interest packet rate to be at or below c/r will not result in an overflow of the remote Data packet queue (i.e., with rate c). Accordingly, if the ingress Interest packet rate for a given link is larger than c/r, the NFD may buffer the Interest packet to reduce the ingress Interest packet rate to c/r. Alternatively, the NFD may send some of the Interest packets to bandwidth-available outgoing links, if possible and/or available. A link becomes fully occupied when the sending rate including both Interest packets and Data packets becomes c. If a link is fully occupied, the NFD may buffer the Interest packet for subsequent forwarding when the link is no longer fully occupied. Alternatively, the NFD may send some of the Interest packets to bandwidth-available outgoing links, if possible and/or available.

In some embodiments of the technology, an NFD may be incorporated into software-defined networks (SDNs) based on OpenFlow (i.e., SDNs with OpenFlow switches) or other SDN protocols. In contrast to TCP/IP where packet forwarding is based on IP routing tables as discussed above, packet forwarding in OpenFlow switches is based on Flow tables. In addition to IP addresses, OpenFlow switches may also utilize metrics, such as, by way of example, Media Access Control (MAC)/IP addresses, TCP/User Datagram Protocol (UDP) ports, etc. from the Flow tables to forward packets. For these NFDs, Name1 of the Interest packet may be specified as multiple Type-Length-Value tuples, or other sufficient data structures, that allows for the use of the Flow tables in forwarding the Interest packet.

FIG. 1 illustrates an overview of an environment 100 and devices on which some embodiments of the technology may operate, arranged in accordance with at least some embodiments described herein. Environment 100 may include one or more end devices 102a and 102b, logically connected to each other through one or more NFD-capable IP routers 104a and 104b. End devices 102a and 102b may be referred to herein as end device 102. Similarly, NFD-capable IP routers 104a and 104b may be referred to herein as IP router 104. End device 102 may be any computing device suitable to execute the TCP/IP protocol architecture. The number of end devices and IP routers depicted in environment 100 is for illustration, and one skilled in the art will appreciate that there may be a different number of end device and/or IP routers. The coupling may be through a local area network, a wide area network, the Internet, and/or other wired or wireless networks, including combinations thereof.

As depicted, an NFD 106 is integrated into each end device 102 and IP router 104 in environment 100. With reference to end device 102, NFD 106 is integrated on top of a TCP layer 108, which is implemented on top of an IP layer 110. With reference to IP router 104, NFD 106 is integrated on top of IP layer 110. In each end device 102 and IP router 104, IP layer 110 is implemented on top of a network interface 112. In general terms, at each end device 102 and IP router 104, network interface 112 provides the sending of TCP/IP packets on the network medium and the receiving of TCP/IP packets off the network medium, and IP layer 110 provides the addressing, packaging, and routing of the TCP packets.

At each end device 102, TCP layer 108 provides session and datagram communication services, including, by way of example, establishment of TCP connections, sequencing and acknowledgment of TCP packets sent, recovery of TCP packets lost during transmission, etc. As discussed above, NFD 106 provides the sending of Interest packets and the receiving of Data packets by each end device 102 and IP router 104.

Figure 2:
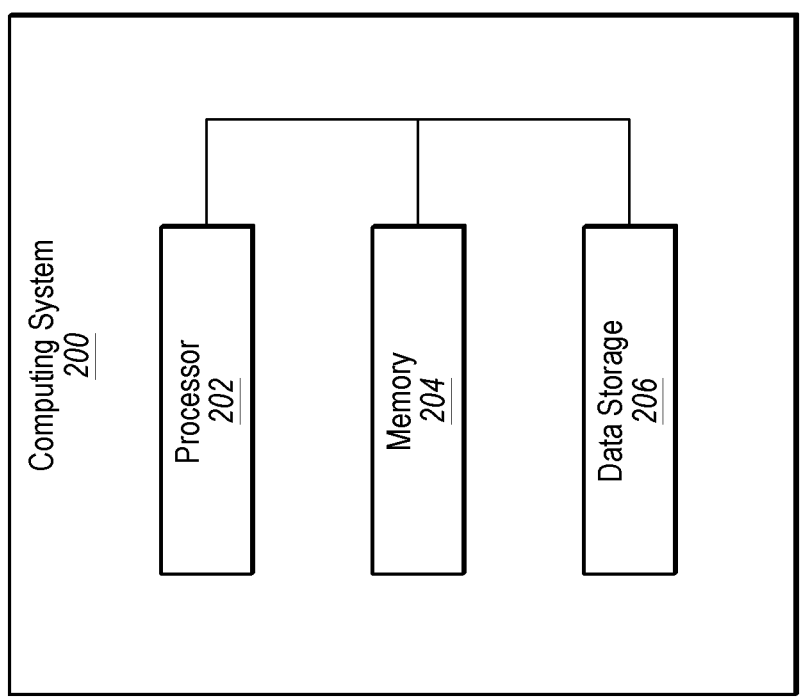
FIG. 2 illustrates selected components of an example general purpose computing system, which may be used to provide network congestion control.

FIG. 2 illustrates selected components of an example general purpose computing system 200, which may be used to provide network congestion control, arranged in accordance with at least some embodiments described herein. Computing system 200 may be configured to implement or direct one or more operations associated with some or all of the components and/or modules associated with NFD 106 of FIG. 1. Computing system 200 may include a processor 202, a memory 204, and a data storage 206. Processor 202, memory 204, and data storage 206 may be communicatively coupled.

In general, processor 202 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, processor 202 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 202 may be configured to interpret and/or execute program instructions and/or process data stored in memory 204, data storage 206, or memory 204 and data storage 206. In some embodiments, processor 202 may fetch program instructions from data storage 206 and load the program instructions in memory 204. After the program instructions are loaded into memory 204, processor 202 may execute the program instructions.

For example, in some embodiments, any one or more of the components and/or modules associated with NFD 106 may be included in data storage 206 as program instructions. Processor 202 may fetch some or all of the program instructions from the data storage 206 and may load the fetched program instructions in memory 204. Subsequent to loading the program instructions into memory 204, processor 202 may execute the program instructions such that the computing system may implement the operations as directed by the instructions.

Memory 204 and data storage 206 may include computer-readable storage media for carrying or having computer-executable instructions or data structures stored thereon. Such computer-readable storage media may include any available media that may be accessed by a general-purpose or special-purpose computer, such as processor 202. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 302 to perform a certain operation or group of operations.

Modifications, additions, or omissions may be made to computing system 200 without departing from the scope of the present disclosure. For example, in some embodiments, computing system 200 may include any number of other components that may not be explicitly illustrated or described herein.

Figure 3:
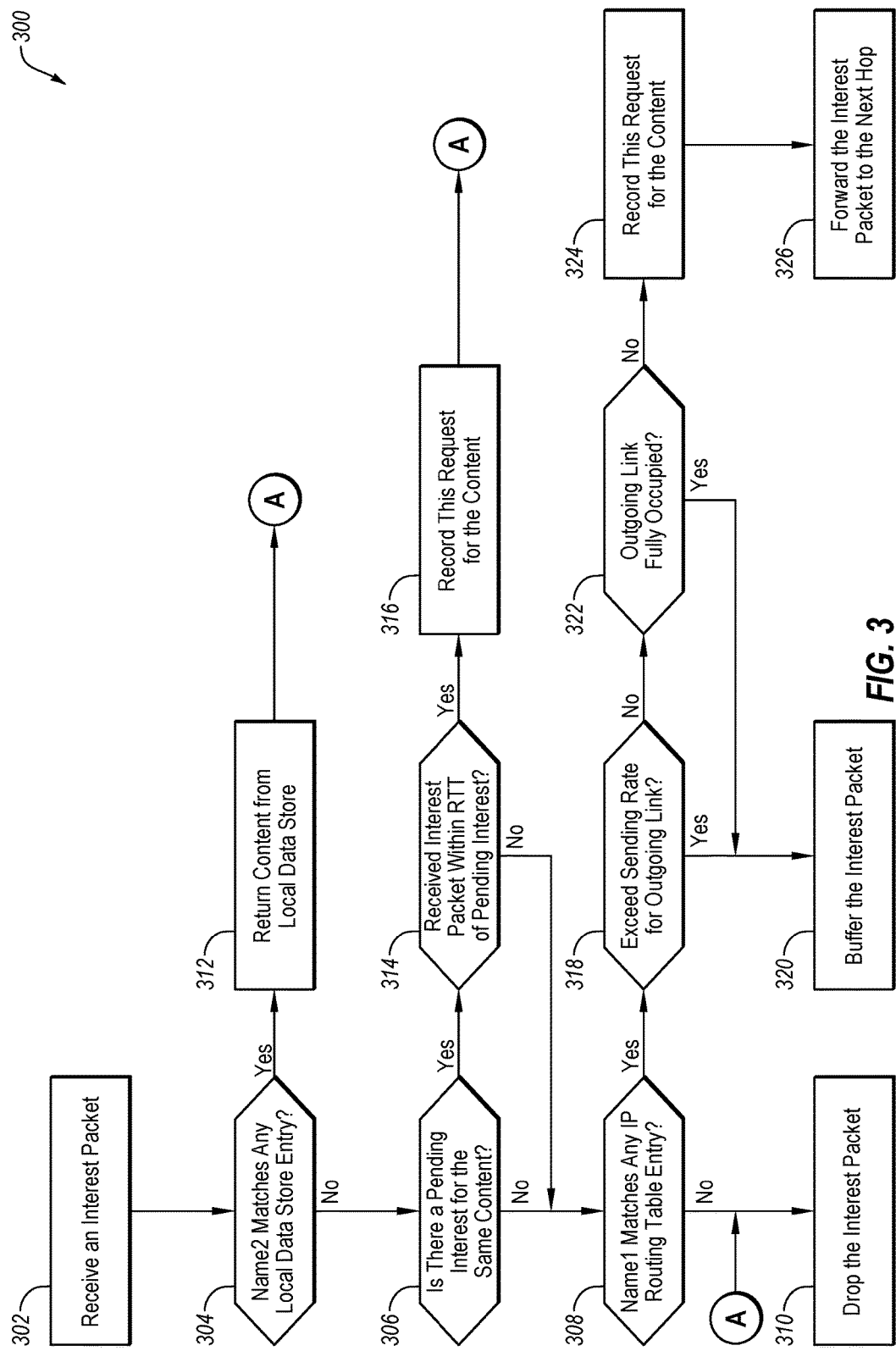
FIG. 3 is a flow diagram that illustrates an example processing by a Named Data Networking Forwarding Daemon (NFD) to forward Interest packets to provide network congestion control in an IP network.

FIG. 3 is a flow diagram 300 that illustrates an example processing by NFD 106 to forward Interest packets to provide network congestion control in an IP network, arranged in accordance with at least some embodiments described herein. Example processes and methods may include one or more operations, functions or actions as illustrated by one or more of blocks 302, 304, 306, 308, 310, 312, 314, 316, 318, 320, 322, 324, and/or 326, and may in some embodiments be performed by a computing system such as computing system 200 of FIG. 2. The operations described in blocks 302-326 may also be stored as computer-executable instructions in a computer-readable medium such as memory 204 and/or data storage 206 of computing system 200.

As depicted by flow diagram 300, the processing by NFD 106 to forward Interest packets to provide network congestion control may begin with block 302 ("Receive an Interest Packet"), where NFD 106 may receive an Interest packet (also referred to as a "present Interest packet" for clarity of discussion) for forwarding, for example, to the next hop or destination. For example, the present Interest packet may have been sent by an application executing on end device 102, or received at NFD-capable IP router 104.

Block 302 may be followed by decision block 304 ("Name2 Matches Any Local Data Store Entry?"), where NFD 106 may determine whether its local data store contains the content requested by the present Interest packet. The present Interest packet may include a Name2 that identifies the name of the content (e.g., the piece of data), and NFD 106 may check its local data store for any matching entry. If NFD 106 determines that its local data store does not contain the requested content, then NFD 106 may determine whether there is a pending Interest packet for the same content (decision block 306, "Is There a Pending Interest for the Same Content?"). That is, NFD 106 may check to determine whether the content requested by the present Interest packet has been already requested, for example, by a previous Interest packet. If NFD 106 determines that there is no pending Interest packet for the same content (i.e., that the content requested by the present Interest packet has not been already requested), then NFD 106 may determine whether its IP routing table includes an entry for the IP address specified in the present Interest packet (decision block 308, "Name1 Matches Any IP Routing Table Entry?"). The present Interest packet may include a Name1 that specifies the IP address (e.g., the destination address), and NFD 106 may check its local IP routing table for any matching entry. If NFD 106 determines that its local IP routing table does not contain an entry that matches the IP address, then NFD 106 may drop the present Interest packet (block 310, "Drop the Interest Packet"). In this instance, NFD 106 does not further process the present Interest packet (e.g., send the present Interest packet to its IP layer) since its IP layer does not know how to send the present Interest packet to the next hop. In some embodiments, NFD 106 may check its local IP routing table to identify an entry with the longest prefix match with the IP address as a matching entry.

Referring again to decision block 304, if NFD 106 determines that its local data store does contain the requested content, then NFD 106 may return the content from its local data store (block 312, "Return Content from Local Data Store"). In this instance, since there is a local copy of the requested content, NFD 106 can provide the requested content from its local data store without having to forward the present Interest packet. Block 312 may be followed by block 310 ("Drop the Interest Packet"), where NFD 106 may drop the present Interest packet since the requested content was returned.

Referring again to decision block 306, if NFD 106 determines that there is a pending Interest packet for the same content (i.e., that the content requested by the present Interest packet has been already requested), then NFD 106 may determine whether the present Interest packet is being processed within a round trip time (RTT) of the pending Interest packet (decision block 314, "Received Interest Packet within RTT of Pending Interest?). Stated differently, NFD 106 may determine whether the pending Interest packet is valid. If NFD 106 determines that the present Interest packet is not being processed within the RTT of the pending Interest packet, then NFD 106 may determine whether its IP routing table includes an entry for the IP address specified in the present Interest packet (decision block 308). In this instance, since the present Interest packet is being processed outside the RTT of the pending Interest packet, NFD 106 needs to determine whether the present Interest packet can be forwarded. That is, NFD 106 is unlikely to receive a Data packet corresponding to the pending Interest packet since the present Interest packet is being processed outside the RTT of the pending Interest packet.

Otherwise, if NFD 106 determines that the present Interest packet is being processed within the RTT of the pending Interest packet, then NFD 106 may make a record of the present Interest packet (block 316, "Record This Request for the Content"). The record is an indication that the present Interest packet also requested the content. In this instance, NFD 106 need not forward the present Interest packet since the pending Interest packet is still valid. That is, NFD 106 does not need to forward another request for the same content. Block 316 may be followed by block 310 ("Drop the Interest Packet"), where NFD 106 may drop the present Interest packet since a request for the content has been forwarded.

Referring again to decision block 308, if NFD 106 determines that its local IP routing table does contain an entry that matches the IP address, then NFD 106 may determine whether forwarding the present Interest packet over an outgoing link will cause the outgoing link to exceed its sending rate (decision block 318, "Exceed Sending Rate for Outgoing Link?). If NFD 106 determines that forwarding the present Interest packet over the outgoing link will cause the outgoing link to exceed its sending rate (e.g., when the outgoing link exceeds the Interest sending rate, the Data rate on the reserve path will exceed the link capacity), then NFD 106 may buffer the present Interest packet for forwarding at a later time (block 320, "Buffer the Interest Packet"). For example, the present Interest packet may be buffered for forwarding when forwarding the present Interest packet over the outgoing link will not cause the outgoing link to exceed its sending rate. In some embodiments, if forwarding the Interest packet will exceed the sending rate for the outgoing link, NFD 106 may attempt to forward or send the Interest packet over a different outgoing link, if possible.

Otherwise, if NFD 106 determines that forwarding the present Interest packet over the outgoing link will not cause the outgoing link to exceed its sending rate, then NFD 106 may determine whether the outgoing link is fully occupied (decision block 322, "Outgoing Link Fully Occupied?"). If NFD 106 determines that the outgoing link is fully occupied (e.g., reaches the link capacity), then NFD 106 may buffer the present Interest packet for forwarding at a later time (block 320). For example, the present Interest packet may be buffered for forwarding when the outgoing link is not fully occupied. In some embodiments, if the outgoing link is fully occupied, NFD 106 may attempt to forward or send the Interest packet over a different outgoing link, if possible.

Otherwise, if NFD 106 determines that the outgoing link is not fully occupied, then NFD 106 may make a record of the present Interest packet, for example, in the PIT (block 324, "Record This Request for the Content"). The record is an indication that the present Interest packet has been forwarded. Block 324 may be followed by block 326 ("Forward the Interest Packet to the Next Hop"), where NFD 106 may forward the present Interest packet to the next hop or destination. For example, the present Interest packet may be forwarded according to the matching entry in the local IP routing table.

Figure 4:
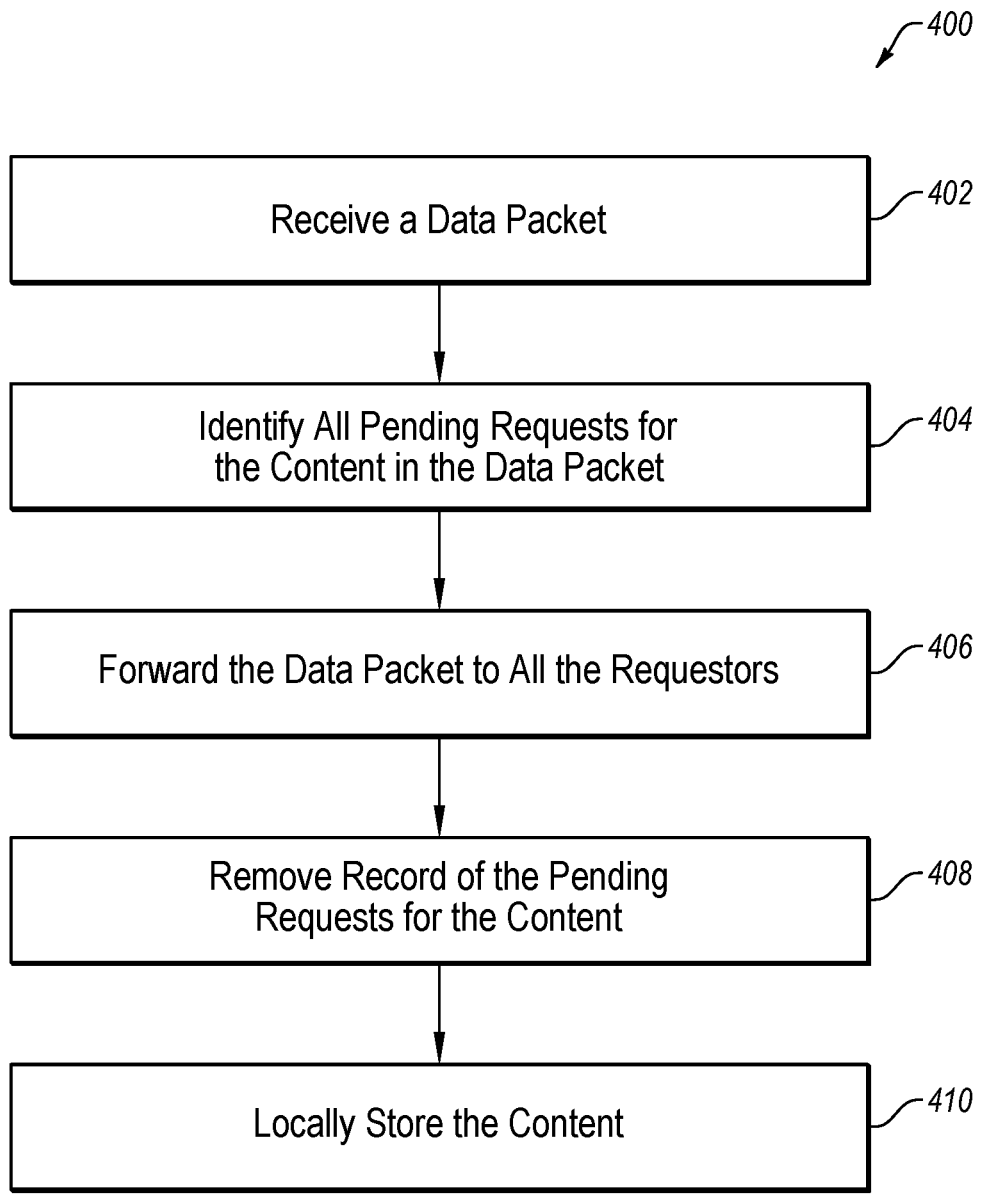
FIG. 4 is a flow diagram that illustrates an example processing by an NFD to forward Data packets to provide network congestion control.

FIG. 4 is a flow diagram 400 that illustrates an example processing by NFD 106 to forward Data packets to provide network congestion control, arranged in accordance with at least some embodiments described herein. Example processes and methods may include one or more operations, functions or actions as illustrated by one or more of blocks 402, 404, 406, 408, and/or 410, and may in some embodiments be performed by a computing system such as computing system 200 of FIG. 2. The operations described in blocks 402-410 may also be stored as computer-executable instructions in a computer-readable medium such as memory 204 and/or data storage 206 of computing system 200.

As depicted by flow diagram 400, the processing by NFD 106 to forward Data packets to provide network congestion control may begin with block 402 ("Receive a Data Packet"), where NFD 106 may receive a Data packet for forwarding, for example, to the next hop or destination. For example, the Data packet may have been received at IP router 104.

Block 402 may be followed by block 404 ("Identify All Pending Requests for the Content in the Data Packet"), where NFD 106 may identify all pending requests for the content being delivered in the Data packet. For example, NFD 106 may maintain a record of pending Interest packets, for example, in the PIT, (i.e., a record of each requestor) that requested the content that is being delivered in the Data packet.

Block 404 may be followed by block 406 ("Forward the Data Packet to All the Requestors"), where NFD 106 may forward the Data packet to each requestor. That is, NFD 106 may forward a copy of the Data packet to respond to each pending Interest packet.

Block 406 may be followed by block 408 ("Remove Record of the Pending Requests for the Content"), where NFD 106 may remove the record of pending requests for the content. For example, NFD 106 may remove the record of requestors that requested the content, for example, from the PIT, since the content was forwarded to each requestor.

Block 408 may be followed by block 410 ("Locally Store the Content"), where NFD 106 may locally store a copy of the content being delivered in the Data packet. For example, NFD 106 may maintain a local copy of the content for subsequent use. Different caching policies may be applied for each NFD, so that each NFD can decide whether to store a copy of the content or not, according to the caching policies.

Figure 5:
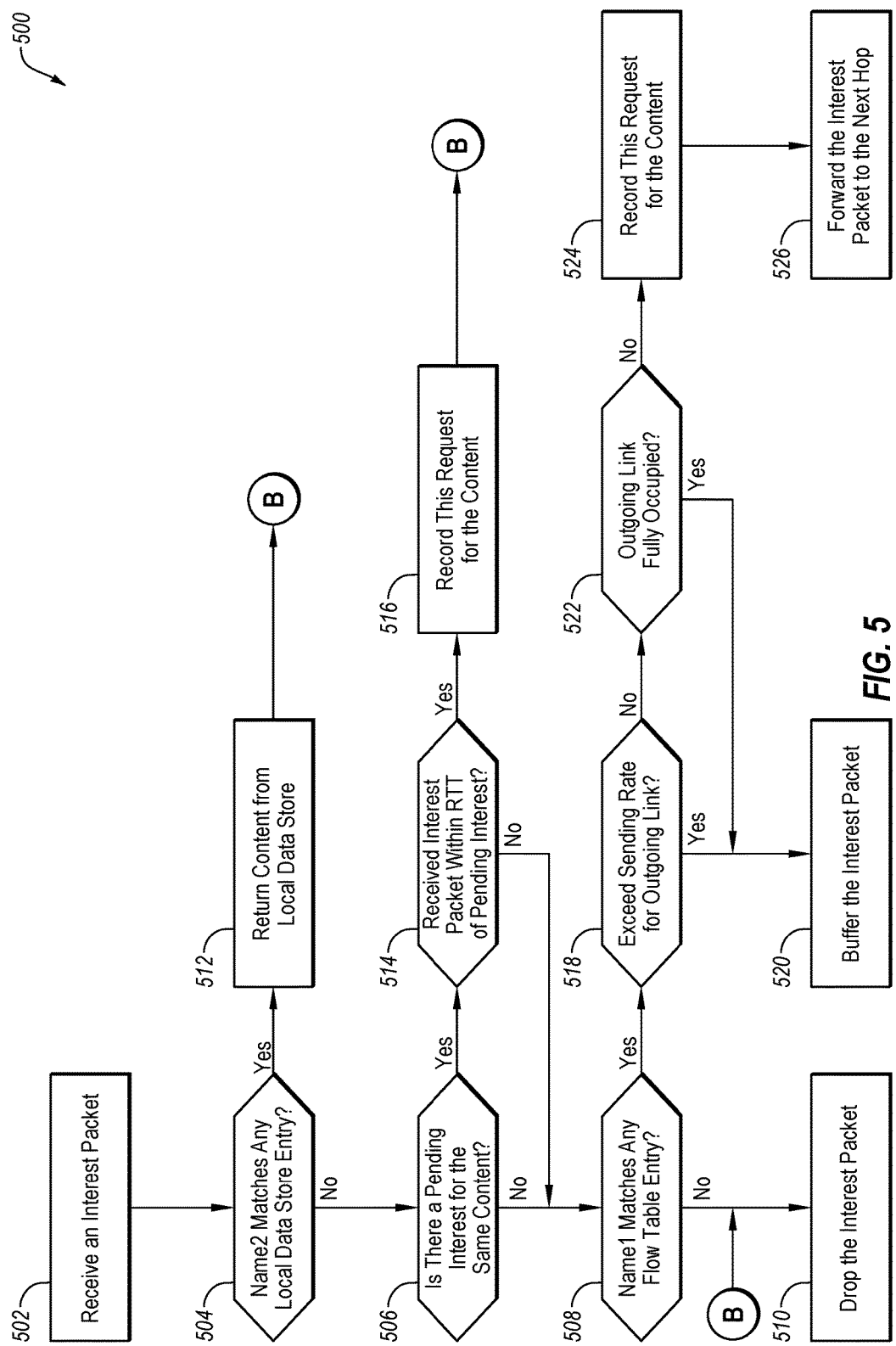
FIG. 5 is a flow diagram that illustrates an example processing by an NFD to forward Interest packets to provide network congestion control in a software defined network, all arranged in accordance with at least some embodiments described herein.

FIG. 5 is a flow diagram 500 that illustrates an example processing by NFD 106 to forward Interest packets to provide network congestion control in a software defined network (SDN), arranged in accordance with at least some embodiments described herein. Example processes and methods may include one or more operations, functions or actions as illustrated by one or more of blocks 502, 504, 506, 508, 510, 512, 514, 516, 518, 520, 522, 524, and/or 526, and may in some embodiments be performed by a computing system such as computing system 200 of FIG. 2. The operations described in blocks 502-526 may also be stored as computer-executable instructions in a computer-readable medium such as memory 204 and/or data storage 206 of computing system 200.

As depicted by flow diagram 500, the processing by NFD 106 to forward Interest packets to provide network congestion control may begin with block 502 ("Receive an Interest Packet"), where NFD 106 may receive an Interest packet (also referred to as a "present Interest packet" for clarity of discussion) for forwarding, for example, to the next hop or destination.

Block 502 may be followed by decision block 504 ("Name2 Matches Any Local Data Store Entry?"), where NFD 106 may determine whether its local data store contains the content requested by the present Interest packet. If NFD 106 determines that its local data store does not contain the requested content, then NFD 106 may determine whether there is a pending Interest packet for the same content (decision block 506, "Is There a Pending Interest for the Same Content?"). That is, NFD 106 may check to determine whether the content requested by the present Interest packet has been already requested, for example, by a previous Interest packet. If NFD 106 determines that there is no pending Interest packet for the same content, then NFD 106 may determine whether its Flow table includes an entry for the address specified in the present Interest packet (decision block 508, "Name1 Matches Any Flow Table Entry?"). The present Interest packet may include a Name1 that specifies a destination address, and NFD 106 may check its local Flow table for any matching entry. If NFD 106 determines that its local Flow table does not contain an entry that matches the destination address, then NFD 106 may drop the present Interest packet (block 510, "Drop the Interest Packet"). In this instance, NFD 106 does not further process the present Interest packet since the route to the destination is not known.

Referring again to decision block 504, if NFD 106 determines that its local data store does contain the requested content, then NFD 106 may return the content from its local data store (block 512, "Return Content from Local Data Store"). In this instance, since there is a local copy of the requested content, NFD 106 can provide the requested content from its local data store without having to forward the present Interest packet. Block 512 may be followed by block 510 ("Drop the Interest Packet"), where NFD 106 may drop the present Interest packet since the requested content was returned.

Referring again to decision block 506, if NFD 106 determines that there is a pending Interest packet for the same content, then NFD 106 may determine whether the present Interest packet is being processed within a round trip time (RTT) of the pending Interest packet (decision block 514, "Received Interest Packet within RTT of Pending Interest?"). If NFD 106 determines that the present Interest packet is not being processed within the RTT of the pending Interest packet, then NFD 106 may determine whether its local Flow table includes an entry for the destination address specified in the present Interest packet (decision block 508). In this instance, since the present Interest packet is being processed outside the RTT of the pending Interest packet, NFD 106 needs to determine whether the present Interest packet can be forwarded.

Otherwise, if NFD 106 determines that the present Interest packet is being processed within the RTT of the pending Interest packet, then NFD 106 may make a record of the present Interest packet (block 516, "Record This Request for the Content"). The record is an indication that the present Interest packet also requested the content. Block 516 may be followed by block 510 ("Drop the Interest Packet"), where NFD 106 may drop the present Interest packet since a request for the content has been forwarded.

Referring again to decision block 508, if NFD 106 determines that its local Flow table does contain an entry that matches the destination address, then NFD 106 may determine whether forwarding the present Interest packet over an outgoing link will cause the outgoing link to exceed its sending rate (decision block 518, "Exceed Sending Rate for Outgoing Link?"). If NFD 106 determines that forwarding the present Interest packet over the outgoing link will cause the outgoing link to exceed its sending rate, then NFD 106 may buffer the present Interest packet for forwarding at a later time (block 520, "Buffer the Interest Packet"). In some embodiments, if forwarding the Interest packet will exceed the sending rate for the outgoing link, NFD 106 may attempt to forward or send the Interest packet over a different outgoing link, if possible.

Otherwise, if NFD 106 determines that forwarding the present Interest packet over the outgoing link will not cause the outgoing link to exceed its sending rate, then NFD 106 may determine whether the outgoing link is fully occupied (decision block 522, "Outgoing Link Fully Occupied?"). If NFD 106 determines that the outgoing link is fully occupied, then NFD 106 may buffer the present Interest packet for forwarding at a later time (block 520). In some embodiments, if the outgoing link is fully occupied, NFD 106 may attempt to forward or send the Interest packet over a different outgoing link, if possible.

Otherwise, if NFD 106 determines that the outgoing link is not fully occupied, then NFD 106 may make a record of the present Interest packet (block 524, "Record This Request for the Content"). Block 524 may be followed by block 526 ("Forward the Interest Packet to the Next Hop"), where NFD 106 may forward the present Interest packet to the next hop or destination. For example, the present Interest packet may be forwarded according to the matching entry in the local Flow table.

As indicated above, the embodiments described in the present disclosure may include the use of a special purpose or general purpose computer (e.g., processor 250 of FIG. 2) including various computer hardware or software modules, as discussed in greater detail herein. Further, as indicated above, embodiments described in the present disclosure may be implemented using computer-readable media (e.g., memory 252 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A system configured to control network congestion in packet-based networks, the system comprising:
   one or more Internet Protocol (IP) routers; and
   a Named Data Networking Forwarding Daemon (NFD) integrated into each of the one or more IP routers, wherein each NFD is configured to:
      determine whether content requested by an Interest packet is in a local content store, wherein the Interest packet includes a Name1 that specifies a destination IP address and a Name2 that identifies the requested content;
      responsive to determining that the requested content is in the local content store, return the requested content from the local content store and discard the Interest packet;
      responsive to determining that the requested content is not in the local content store, determine whether a previous request has been made by the NFD for the requested content and whether the Interest packet is received within a round trip time of the previous request;
      responsive to determining that the previous request has been made by the NFD for the requested content and the Interest packet is received within the round trip time of the previous request, create a record of the request for the content by the Interest packet and discard the Interest packet;
      responsive to determining that the previous request has not been made by the NFD for the requested content or that the Interest packet is not received within the round trip time of the previous request, determine whether the destination IP address is in a local IP routing table;

responsive to determining that the destination IP address is in the local IP routing table, create a record of the request for the content by the Interest packet and forward the Interest packet for further processing, the forwarding of the Interest packet being according to a forwarding strategy that is based on a sending rate for a corresponding outgoing link of the Interest packet being at or below a quotient of "c/r" where "c" is a link capacity of the corresponding outgoing link and "r" is a ratio of a data size of a Data packet that corresponds to the Interest packet over an interest size of the Interest packet; and responsive to determining that the destination IP address is not in the local IP routing table, discard the Interest packet.

2. The system of claim 1, further comprising at least one Transmission Control Protocol/Internet Protocol (TCP/IP) computing system including an integrated NFD.

3. The system of claim 1, wherein the forwarding strategy includes a check to determine whether forwarding the Interest packet will exceed the sending rate for the outgoing link.

4. The system of claim 3, wherein the NFD is further configured to buffer the Interest packet to be forwarded at a subsequent time in response to determining that forwarding the Interest packet will exceed the sending rate for the outgoing link.

5. The system of claim 3, wherein the NFD is further configured to attempt to forward the Interest packet over a different outgoing link in response to determining that forwarding the Interest packet will exceed the sending rate for the outgoing link.

6. The system of claim 1, wherein the forwarding strategy includes a check to determine whether the outgoing link is fully occupied.

7. The system of claim 6, wherein the NFD is further configured to buffer the Interest packet to be forwarded at a subsequent time in response to determining that the outgoing link is fully occupied.

8. The system of claim 7, wherein the NFD is further configured to attempt to forward the Interest packet over a different outgoing link in response to determining that the outgoing link is fully occupied.

9. A method to control network congestion in packet-based networks, the method comprising:

receiving an Interest packet, the Interest packet including a destination Internet Protocol (IP) address and a content name that identifies content that is requested by the Interest packet;

determining whether the content identified by the content name and requested by the Interest packet is in a local content store;

responsive to determining that the content identified by the content name is not in the local content store, determining whether a previous request has been made for the content identified by the content name and whether the Interest packet is received within a round trip time of the previous request, the determining whether the previous request has been made and whether the Interest packet is received within the round trip time being in place of returning, based on the content identified by the content name being in the local content store, the requested content from the local content store and discarding the Interest packet;

responsive to determining that the previous request has not been made for the content identified by the content name or that the Interest packet is not received within the round trip time of the previous request, determining whether the destination IP address is in a local IP routing table, the determining whether the destination IP address is in the local IP routing table being in place of creating, based on the previous request being made for the content identified by the content name and the Interest packet being received within the round trip time of the previous request, a record of the request for the content by the Interest packet and discarding the Interest packet; and responsive to determining that the destination IP address is in the local IP routing table, creating a record of the request for the content by the Interest packet and forwarding the Interest packet for further processing in place of discarding, based on the destination IP address not being in the local IP routing table, the Interest packet, the forwarding of the Interest packet being according to a forwarding strategy that is based on a sending rate for a corresponding outgoing link of the Interest packet being at or below a quotient of "c/r" where "c" is a link capacity of the corresponding outgoing link and "r" is a ratio of a data size of a Data packet that corresponds to the Interest packet over an interest size of the Interest packet.

10. The method of claim 9, further comprising buffering the Interest packet for forwarding at a subsequent time in response to determining that forwarding the Interest packet will exceed the sending rate for the outgoing link.

11. The method of claim 9, further comprising attempting to forward the Interest packet over a different outgoing link in response to determining that forwarding the Interest packet will exceed the sending rate for the outgoing link.

12. The method of claim 9, further comprising buffering the Interest packet for forwarding at a subsequent time in response to determining that the outgoing link is fully occupied.

13. The method of claim 9, further comprising attempting to forward the Interest packet over a different outgoing link in response to determining that the outgoing link is fully occupied.

14. The method of claim 9, wherein the Interest packet includes a type-length-value tuple, and further wherein the local IP routing table is a local Flow table.

15. One or more non-transitory computer-readable storage media storing thereon instructions that, in response to execution by a processor, cause the processor to:

receive an Interest packet, the Interest packet including a destination Internet Protocol (IP) address and a content name that identifies content that is requested by the Interest packet;

determine whether the content identified by the content name and requested by the Interest packet is in a local content store;

responsive to determining that the content identified by the content name is in the local content store, return the requested content from the local content store and discard the Interest packet;

responsive to determining that the content identified by the content name is not in the local content store, determine whether a previous request has been made for the content identified by the content name and whether the Interest packet is received within a round trip time of the previous request;

responsive to determining that the previous request has been made for the content identified by the content name and the Interest packet is received within the round trip time of the previous request, create a record of the request for the content by the Interest packet and discard the Interest packet;

responsive to determining that the previous request has not been made for the content identified by the content name or that the Interest packet is not received within the round trip time of the previous request, determine whether the destination IP address is in a local IP routing table;

responsive to determining that the destination IP address is in the local IP routing table, create a record of the request for the content by the Interest packet and forward the Interest packet for further processing, the forwarding of the Interest packet being according to a forwarding strategy that is based on a sending rate for a corresponding outgoing link of the Interest packet being at or below a quotient of "c/r" where "c" is a link capacity of the corresponding outgoing link and "r" is a ratio of a data size of a Data packet that corresponds to the Interest packet over an interest size of the Interest packet; and responsive to determining that the destination IP address is not in the local IP routing table, discard the Interest packet.

16. The non-transitory computer-readable storage media of claim 15, wherein the Interest packet includes a type-length-value tuple, and further wherein the local IP routing table is a local Flow table.

17. The non-transitory computer-readable storage media of claim 15, further storing thereon instructions that, in response to execution by the processor, cause the processor to buffer the Interest packet to be forwarded at a subsequent time in response to determining that forwarding the Interest packet will exceed the sending rate for the outgoing link.

18. The non-transitory computer-readable storage media of claim 15, further storing thereon instructions that, in response to execution by the processor, cause the processor to buffer the Interest packet to be forwarded at a subsequent time in response determining that the outgoing link is fully occupied.

\* \* \* \* \*